[54] PRESSURELESS METHOD OF FORMING A SILICON CARBIDE CERAMIC MATERIAL

[75] Inventor: Samuel S. Shinozaki, Livonia, Mich.

[73] Assignee: Ford Motor Company, Dearborn, Mich.

[21] Appl. No.: 49,663

[22] Filed: Jun. 18, 1979

[51] Int. Cl.³ ............................................... C04B 35/56
[52] U.S. Cl. ........................................ 264/56; 106/44; 264/66
[58] Field of Search ...................... 106/44; 264/56, 65, 264/66

[56] References Cited

U.S. PATENT DOCUMENTS

| | | | |
|---|---|---|---|
| 3,998,646 | 12/1976 | Weaver | 106/44 |
| 4,041,117 | 8/1977 | Prochazka | 264/63 |
| 4,080,415 | 3/1978 | Coppola et al. | 106/44 |
| 4,120,827 | 10/1978 | Boos et al. | 264/65 |
| 4,135,938 | 1/1979 | Murata et al. | 106/44 |

Primary Examiner—Donald J. Arnold
Attorney, Agent, or Firm—William E. Johnson; Olin B. Johnson

[57] ABSTRACT

A method of forming a silicon carbide ceramic material without forming large areas of a feathered alpha silicon carbide microstructure is disclosed. Basically, the method involves heating the silicon carbide material to a temperature in a range from about 1850° C. to about 1920° C., preferably about 1900° C., and maintaining the material at the selected temperature for a period of time from about 6 hours to about 12 hours. Such a heating cycle produces silicon carbide ceramic material which does not have large areas of a feathered alpha silicon carbide microstructure therein.

4 Claims, 2 Drawing Figures

PRESSURELESS METHOD OF FORMING A SILICON CARBIDE CERAMIC MATERIAL

BACKGROUND OF THE INVENTION

Since at least 1974, the General Electric Corporation has worked in the area of making bodies of silicon carbide material by pressureless sintering techniques. Basically, they have proposed that one begin the manufacture of such bodies using submicron beta silicon carbide powder. That powder may be subjected to an operation to form it into a consolidated mass, for example, a slip casting operation or a pressing operation. After the submicron beta silicon carbide powder is consolidated, General Electric has taught that the material should be heated to a temperature in excess of 2000° C. for a period of time of about 1 hour in order to achieve a sintering of the individual beta silicon carbide particles into a single unitary body.

In a paper entitled "Microstructures of Sintered Silicon Carbide" as reported in Ceramic Microstructures, Proceedings of the 6th International Materials Symposium, Westview Press, Colorado (1977), Messrs. C. A. Johnson and S. Prochazka of the General Electric Corporate Research and Development report, beginning at page 366, that large feathery-like alpha silicon carbide platlet grains are developed when beta silicon carbide powder is sintered together. The paper describes that these feathered grains reduce the strength of the overall body. Their paper also indicates that these platlets are formed by what they believe to be a combination of excessively high temperatures and certain chemical impurities such as aluminum.

In my work in this area, I have found that these enlarged platlets can be avoided in a sintering operation if that sintering operation is carried out under certain conditions to be described herein. Thus, even though the powders which I worked upon had the same impurities as contained in the powders worked on by the General Electric personnel, because the powders came from the same common General Electric source, I can now state that the impurities contained in these powders do not generate the particular feathery microstructure. The particular feathery microstructure is generated solely because of the temperature regime in which the prior art suggested that the sintering of such material be carried out. When this material is heated to a temperature in excess of about 1920° C., a temperature lower than the lowest of 2000° C. suggested in the art, I have found that the feathery microstructure is produced, and is produced in a manner in which substantially large grains of such material are found in the microstructure.

SUMMARY OF THE INVENTION

This invention relates to a method of densifying and sintering silicon carbide particles together. The invention also relates to a method of making high purity alpha silicon carbide powder having a very uniform shrink characteristic when subjected to a sintering operation.

In accordance with the preferred teachings of the method of densifying and sintering silicon carbide particles together without forming large areas of a feathered alpha silicon carbide microstructure, the method has the following steps. The silicon carbide particles to be densified and sintered together are heated to a temperature in a range from about 1850° C. to about 1920° C. After the particles have been heated to this temperature range, the silicon carbide particles are maintained at the temperature in the range from about 1850° C. to about 1920° C. for a period of time from about 6 hours to about 12 hours. During this heating period, the silicon carbide particles are sintered together and densified without formation of large areas of a feathered alpha silicon carbide microstructure. By heating to the lower temperature, I believe that a great multiplicity of sites are established for the growing of individual grains whereby the large platlet type of grains are not formed.

In accordance with the method of making a high purity alpha silicon carbide powder having a very uniform shrink characterisitic when subjected to a sintering operation, the method of this invention has the following steps. An unconsolidated mass of silicon carbide particles are placed on a surface in a furnace. The furnace is then heated with the silicon carbide particles contained therein to a temperature in a range from about 1850° C. to about 1920° C. Once the unconsolidated silicon carbide particles are heated to the required temperature, they are maintained at that temperature in the range from about 1850° C. to about 1920° C. for a period of time from about 6 hours to about 12 hours. During this period of heating, the individual silicon carbide particles are transformed into an alpha silicon carbide material which does not contain large feathered alpha silicon carbide areas therein.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, and in which:

DESCRIPTION OF THE PREFERRED EMBODIMENT

Several companies have been working in the area of pressureless sintering of silicon carbide material. One such company is the General Electric Corporation. They have proposed that one begin the manufacture of a silicon carbide body using submicron beta silicon carbide powder. The powder is first consolidated into a particular shape, for example, by means of a slip casting operation or a powder pressing operation. After this submicron beta silicon carbide starting powder is consolidated, General Electric has taught that the material should be heated to a temperature in excess of 2000° C. for a period of time of about 1 hour in order to sinter the individual beta silicon carbide particles into a single body.

Figure 1:
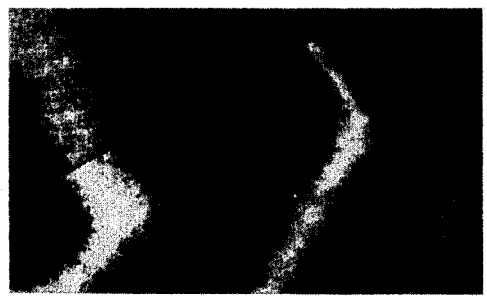
FIG. 1 is an electron microphotograph enlarged 300,000 times showing a feathered alpha silicon carbide grain structure.

When such processing is carried out, extremely long grains of an alpha silicon carbide structure are developed. These grains have a feathery structure such as shown in FIG. 1. As seen in this Figure, the alpha silicon carbide of the feathery grain is put together in such a manner that parallel platlets are formed intersecting along an axis. This form of structure introduces weaknesses into the finished body.

While FIG. 1 shows a highly magnified single grain of this material, in actuality any manufactured body has a large plurality of these grains, with some of the grains being extremely large, as large as about 200 μm.

I have discovered that the large grains of this alpha silicon carbide material which produces the feathery type structure may be substantially reduced by controlling the heat regime to which the material is subjected. By following the heating schedule that I have outlined, many independent sites of alpha silicon carbide formation are nucleated during the heating thereof so that those alpha silicon carbide grains that are produced are randomly distributed and are of a large number whereby no large individual grains are grown. By growing a plurality of small grains, many different interfaces at a large number of different angles are created thereby providing for greater rigidity and strength in the body.

In actuality, I have developed two methods. A first method taught in the specification is one for producing a densified and sintered silicon carbide body, whereas the second method is one for producing a high purity alpha silicon carbide powder having a uniform shrink characteristic when the powder is subjected to a sintering operation.

In accordance with the preferred teachings of the method of densifying and sintering silicon carbide particles together without formation of large areas of a feathered alpha silicon carbide microstructure, the preferred method has the following steps.

Silicon carbide particles to be densified are selected. Mainly, the type of silicon carbide used is beta silicon carbide having a small grain size in the range of 0.1 to 1 μm.

The silicon carbide particles to be densified and sintered together are formed in the shape of the body desired. The forming operation may be an injection molding one, may be a slip casting process, or any of the other particle agglomerating processes already known to those skilled in the art. After the body has been made, the silicon carbide particles of the body are heated to a temperature in a range from about 1850° C. to about 1920° C., preferably about 1900° C. After the particles shaped into the body have been heated to this temperature range, the silicon carbide particles are maintained at the temperature in a range from about 1850° C. to about 1920° C. for a period of time of from about 6 hours to about 12 hours. During this heating period, the silicon carbide particles are sintered together and densified. This sintering and densification occurs without formation of large areas of a feathered alpha silicon carbide microstructure. By heating to these lower temperatures, temperatures much lower than previously suggested, I believe that a greater number of sites are established for the growing of individual grains whereby the large grains of feathered alpha silicon carbide are avoided.

Figure 2:
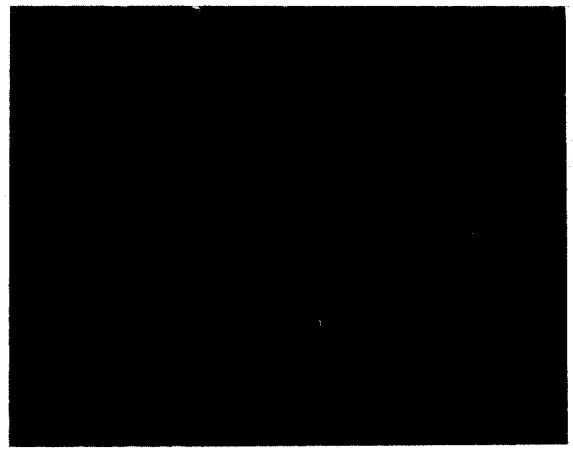
FIG. 2 is a photomicrograph enlarged 500 times of the structure developed when silicon carbide material is treated in accordance with the method of this invention.

The structure produced by my process is shown in FIG. 2. In that photomicrograph, the rod-like structures are formed from a beta silicon carbide phase and interdispersed with the alpha silicon carbide grains. As seen in the photomicrograph, the alpha silicon carbide grains have not grown into large crystals and a great deal of the material is spread about in the beta silicon carbide material. The intermixture of these two elements in such a random fashion produces a microstructure which has a great deal of interfacial area lying in a random and varied number of planes whereby the strength of the material is increased substantially over a structure in which many platlets are aligned in the same direction.

In accordance with the method of making a high purity alpha silicon carbide powder having a very uniform shrink characteristic when subjected to a sintering operation, the preferred method of this invention is as follows. An unconsolidated mass of silicon carbide particles are placed on a surface in a furnace. The silicon carbide particles may be like the silicon carbide particles discussed above. The furnace is then heated with the silicon carbide particles contained therein to a temperature in a range from about 1850° C. to about 1920° C. Once the unconsolidated silicon carbide particles are heated to the required temperature, they are maintained at that temperature in the range from about 1850° C. to about 1920° C. for a period of time from about 6 hours to about 12 hours. During this period of heating, the individual silicon carbide particles are transformed into alpha silicon carbide material which does not contain large feathered alpha silicon carbide grains therein.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. A pressureless method of densifying and sintering silicon carbide particles together without forming large areas of a feathered alpha silicon carbide microstructure, which method comprises the steps of:

heating the silicon carbide particles to be densified and sintered together to a temperature in the range from about 1850° C. to about 1920° C.; and maintaining said silicon carbide particles at said temperature in the range from about 1850° C. to about 1920° C. for a period of time from about 6 hours to about 12 hours whereby said silicon carbide particles are sintered together and densified without formation of large grains of a feathered alpha silicon carbide microstructure.

2. The method of claim 1 wherein: said temperature for said sintering operation is about 1900° C.

3. A pressureless method of making high purity alpha silicon carbide powder having a very uniform shrink characteristic when subjected to a sintering operation, which method comprises:

placing unconsolidated silicon carbide particles on a surface in a furnace;

heating the silicon carbide particles to a temperature in a range from about 1850° C. to about 1920° C.; and maintaining said silicon carbide particles at said temperature in the range from about 1850° C. to about 1920° C. for a period of time from about 6 hours to about 12 hours whereby the particles are converted to a high purity alpha silicon carbide powder without formation in the powder of large grains of a feathered alpha silicon carbide microstructure.

4. The method of claim 1 wherein: said temperature for said sintering operation is about 1900° C.

* * * * *